United States Patent [19]

Sablatura

[11] Patent Number: 4,646,968
[45] Date of Patent: Mar. 3, 1987

[54] PRILLING APPARATUS

[75] Inventor: Edward F. Sablatura, Lake Jackson, Tex.

[73] Assignee: The Dow Chemical Company, Midland, Mich.

[21] Appl. No.: 724,122

[22] Filed: Apr. 17, 1985

[51] Int. Cl.⁴ .......................... B05B 1/24; B05B 7/06; A62C 1/12

[52] U.S. Cl. ........................................ 239/10; 239/79; 239/82; 239/424; 239/425

[58] Field of Search ................ 239/79, 82, 424, 424.5, 239/425, 426, 10

[56] References Cited

U.S. PATENT DOCUMENTS

| | | | |
|---|---|---|---|
| 1,492,593 | 5/1924 | Day | 239/8 |
| 2,072,375 | 3/1937 | McCallum | 23/1 |
| 2,090,150 | 8/1937 | Pontius, Jr. | 239/425 |
| 2,125,764 | 8/1938 | Benoit | 239/79 |
| 2,531,174 | 11/1950 | Tomlin | 266/23 |
| 2,586,348 | 2/1952 | Kuebler | 118/48 |
| 2,942,790 | 6/1960 | Starkey et al. | 239/405 |
| 3,015,449 | 1/1962 | Meyer | 239/424 X |
| 3,085,750 | 4/1963 | Kenshol | 239/79 X |
| 3,093,314 | 6/1963 | Meyer | 239/417 |
| 3,219,274 | 11/1965 | Roche | 239/133 |
| 3,253,783 | 5/1966 | Probst et al. | 239/82 |
| 3,344,992 | 10/1967 | Norris | 239/79 X |
| 3,421,702 | 1/1969 | O'Brien | 239/418 |
| 3,534,909 | 10/1970 | Paine | 239/424 X |
| 3,608,831 | 9/1971 | Place | 239/406 |
| 3,668,869 | 6/1972 | DeCorso et al. | 239/290 |
| 3,917,168 | 11/1975 | Tenney | 239/77 |
| 3,988,084 | 10/1976 | Esposito et al. | 239/424 X |
| 4,022,379 | 5/1977 | Ladisch | 239/8 |
| 4,055,300 | 10/1977 | Binoche | 239/290 |
| 4,179,068 | 12/1979 | Dombrowski | 239/13 |
| 4,289,807 | 9/1981 | Christensen et al. | 239/134 |

FOREIGN PATENT DOCUMENTS

| | | | |
|---|---|---|---|
| 46608 | 3/1982 | European Pat. Off. | 239/426 |
| 115182 | 1/1899 | Fed. Rep. of Germany | 239/425 |
| 861542 | 1/1953 | Fed. Rep. of Germany | 239/426 |

Primary Examiner—Joseph F. Peters, Jr.
Assistant Examiner—Patrick N. Burkhart
Attorney, Agent, or Firm—M. W. Barrow

[57] ABSTRACT

A prilling apparatus with which a molten material hardenable upon cooling is prilled to a narrow size distribution without fouling of atomizing fluid ports. The apparatus includes: (a) a nozzle body; (b) a central bore for conducting the feed material through the nozzle body; (c) a plurality of exit passages formed in the nozzle body in fluid communication between the central bore and exterior the nozzle body; and (d) a plurality of atomizing fluid passages adapted for impinging an atomizing fluid upon feed material essentially exteriorly the nozzle body at an angle of from about 120° to about 160°, preferably about 135°-145°, when the atomizing fluid and the feed material are expelled under pressure from the fluid passages and the exit passages, respectively, thereby atomizing the feed material.

13 Claims, 6 Drawing Figures

PRILLING APPARATUS

FIELD OF THE INVENTION

This invention relates to nozzles with which a molten liquid hardenable upon cooling, such as polyoxyethylene glycols, is atomized with an inert gas to form prilled particles.

BACKGROUND OF THE INVENTION

The prilling of molten materials hardenable upon cooling was well known. Typically, the molten material to be prilled was atomized with an inert gas in a nozzle to form droplets of liquid material which cooled and solidified as prilled particles. The size of the liquid droplets formed during the atomization generally determined the size of the prilled particles. For materials such as polyoxyethylene glycols, it was generally desired to form prilled particles with a fairly narrow size distribution, typically such that only relatively small proportions of the particles would be retained on a 10–12 mesh screen or passed through a 100 mesh screen, for example.

A major disadvantage of nozzles heretofore used for prilling was the failure to obtain an acceptably narrow size distribution of the prilled particles, typically necessitating classification of the particles subsequent to prilling and recycling a substantial portion of undersize and/or oversize particles to be reprilled.

Another disadvantage associated with such nozzles was excessive maintenance and lost production time caused by the fouling of the atomizing gas ports by liquid feed material entering into, hardening and plugging the gas ports, totally or partially, thereby adversely affecting the degree of atomization.

Yet another disadvantage was the lack of versatility of heretofore known prilling nozzles. Depending on the feed material, primarily its viscosity, the throughput, and the desired size distribution of the prilled particles, it was often necessary to make adjustments to the prilling nozzle, or to use a different nozzle, to prill different feed materials or to obtain a product of different particle size distribution.

SUMMARY OF THE INVENTION

The present invention provides a prilling apparatus with which a molten material hardenable upon cooling can be prilled to a narrow prill size distribution without substantial fouling of atomizing fluid ports. In addition, the nozzle is versatile, and the same nozzle can be used to prill a wide variety of material to various desired prill size distributions.

Briefly, the prilling apparatus of the present invention includes: (a) a nozzle body; (b) means for conducting molten, hardenable feed material through the nozzle body; (c) a plurality of exit passages formed in the nozzle body in fluid communication between the conducting means and exterior the nozzle body; and (d) a plurality of fluid passages adapted for impinging an atomizing fluid upon feed material essentially exteriorly the nozzle body at an angle of from about 120° to about 160°, preferably from about 135° to about 145°, when the atomizing fluid and the feed material are expelled under pressure from the fluid passages and the exit passages, respectively, thereby atomizing the feed material.

DESCRIPTION OF THE PREFERRED EMBODIMENT

Figure 1:
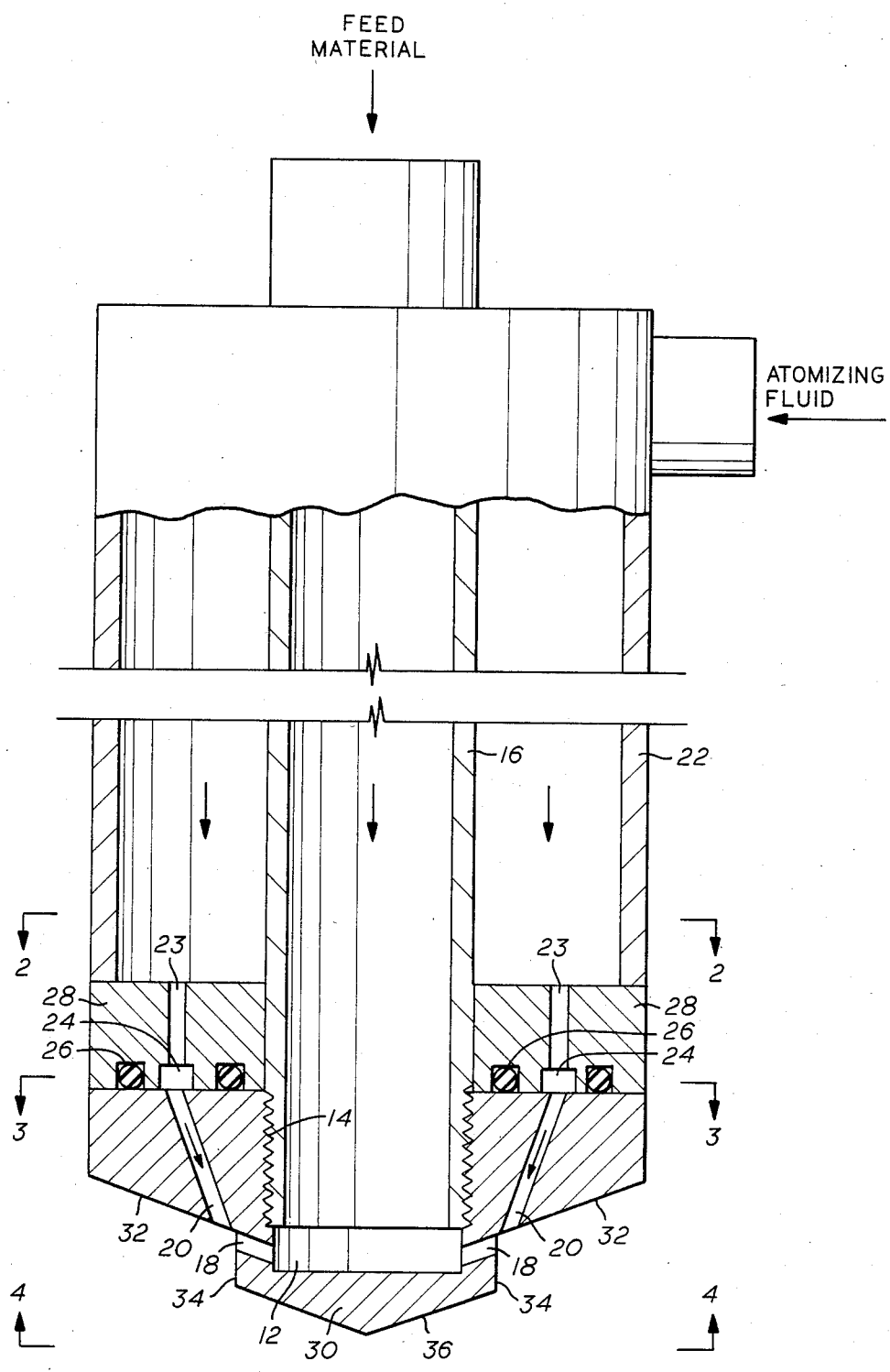
FIG. 1 is a side sectional view of a prilling apparatus of the present invention.
Figure 2:
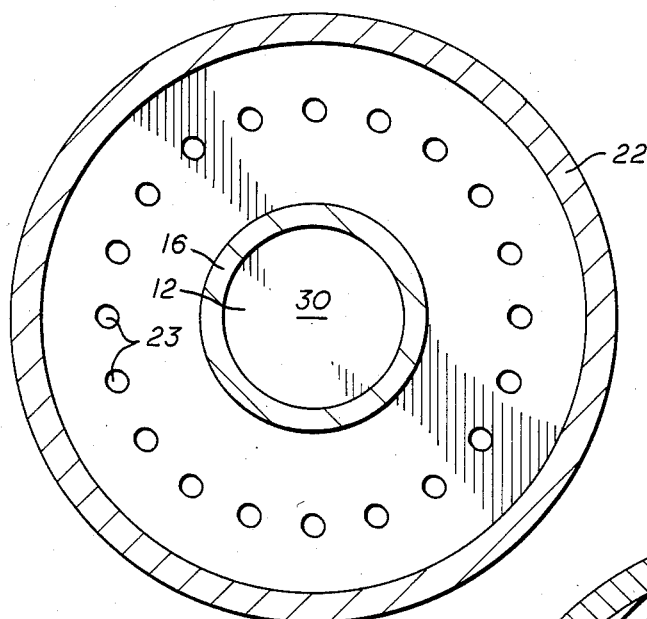
FIG. 2 is a section view of the apparatus of FIG. 1 seen along the lines 2—2.
Figure 3:
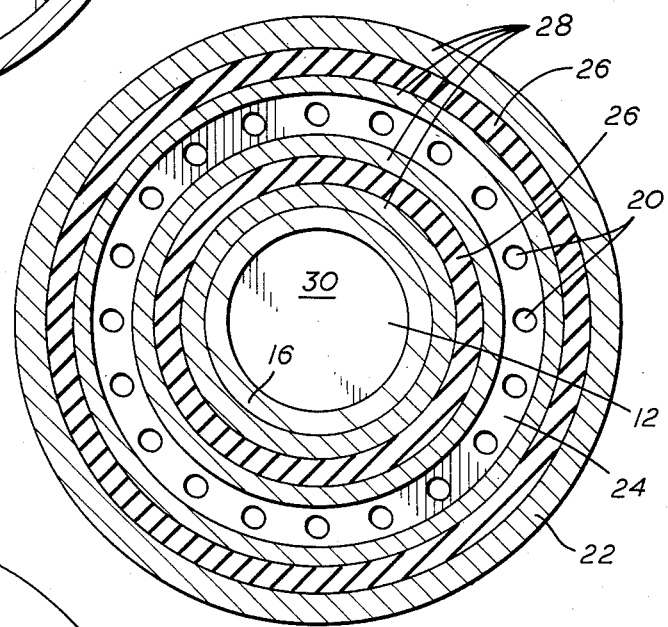
FIG. 3 is a sectional view of the apparatus of FIG. 1 seen along the lines 3—3.
Figure 4:
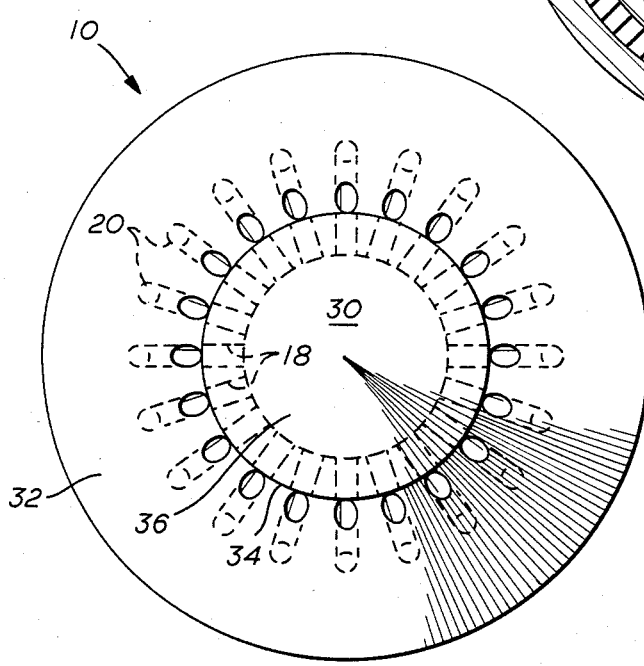
FIG. 4 is a bottom view of the apparatus of FIG. 1 seen along the lines 4—4.

Referring to FIGS. 1–4, the nozzle 10 is provided with a central bore 12 which has a threaded section 14 for connection with a feed conduit 16. A plurality of exit passages 18 extend essentially radially from the longitudinal axis of the nozzle 10, and are in fluid communication between the central bore 12 and the exterior of the nozzle 10.

A plurality of atomizing fluid passages 20 are disposed circumferentially about the central bore 12, an atomizing fluid passage 20 corresponding with each of the exit passages 18. An atomizing fluid conduit 22 is connected to the nozzle 10 in fluid communication with the passages 20 via the passages 23 and the annular space 24 which are sealed from the central bore 12 by means of the O-rings 26 mounted in the plate 28. The atomizing fluid passages 20 are arranged such that atomizing fluid expelled under pressure therefrom impinges essentially exteriorly the nozzle 10 upon feed material expelled under pressure from the exit passages 18 at an angle of from about 120° to about 160°, preferably from about 135° to about 145°. It has been found that impingement angles less than this make it difficult to obtain the degree of desired atomization, while an impingement angle greater than this is nearly impossible to obtain and yet have the impingement occur essentially exteriorly the nozzle as discussed below.

An essential feature of the nozzle 10 is that in operation the atomizing fluid impinges upon the feed material exiting the passages 18 essentially exteriorly the nozzle 10. By this is meant that the impingement occurs after the atomizing fluid exits the passages 20, and that there are no restrictions encountered by the atomized droplets such as blades, orifices, or passages through which the mixed feed material and atomizing fluid must travel before exiting the nozzle 10 which tend to result in coalescense of the atomized feed material droplets, producing oversized prilled particles. Further, the fluid jets of the hardenable feed material exiting the nozzle 10 under pressure through the exit passages 18 should be directed so that they do not enter the fluid passages 20, preferably even though there is no flow of atomizing fluid therethrough, essentially eliminating any risk of fouling of the fluid passages 20 by accumulation of feed material therein.

Figure 5:
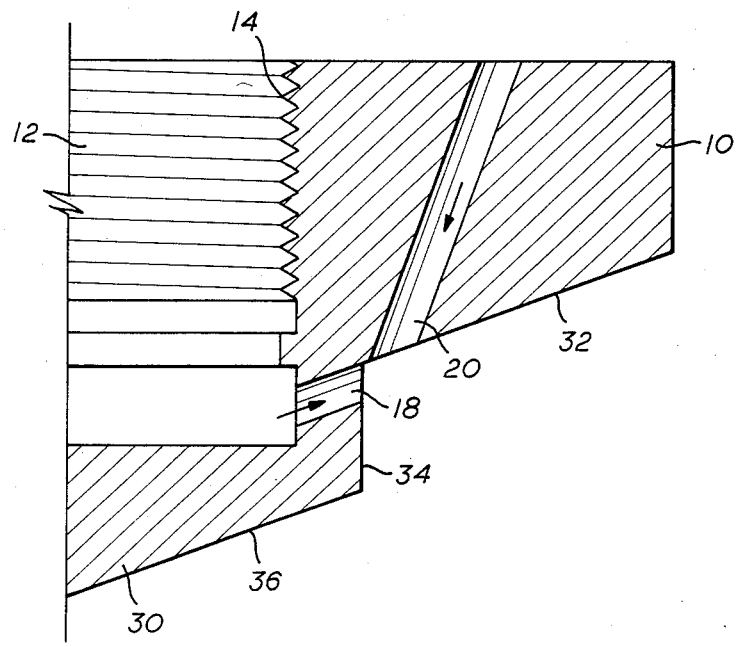
FIG. 5 is an enlarged view of a portion of FIG. 1 showing the impingement area of the nozzle in greater detail.

In FIG. 5, a preferred embodiment is shown in which, taking as a reference the direction of the flow of the molten, hardenable feed material into the central bore 12 coincident with the longitudinal axis, bore 12 extends into a projecting portion 30 of the nozzle 10.

The exit passages 18 are angled about 105°-115° from the longitudinal axis of the nozzle 10, although this angle may vary from about 90° to about 130°. The nozzle 10 has convex frusto-conical surface 32 which is at substantially the same angle with respect to the longitudinal axis as exit passages 18, although this angle may be slightly greater or less. The frusto-conical surface 32 is also longitudinally disposed to facilitate drilling of the passages 18. The atomizing fluid passages 20 are positioned at an angle of about 155°-165° with respect to the longitudinal axis of the nozzle 10, although this angle may vary from about 140° to about parallel with the longitudinal axis, as long as the passage 18 makes an angle with the passage 20 of from about 120° to about 160°. The projecting portion 30 has a generally cylindrical surface 34 and an end surface 36. The shape of surface 34 and surface 36 is not particularly critical, and surface 34 may, if desired, be a frusto-conical surface to facilitate drilling of the passages 20.

Figure 6:
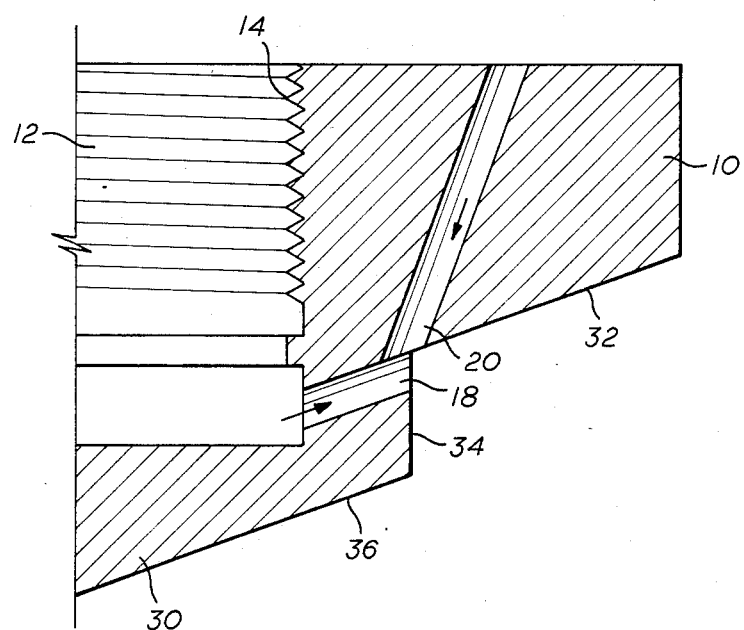
FIG. 6 is an enlarged side sectional view of the impingement area of an alternate embodiment of the nozzle designed for a relatively wide spray pattern.

In the configuration seen in FIG. 5, the exit passages 18 and the fluid passages 20 are disposed slightly away from the longitudinal axis so that the atomizing fluid and the feed material impinge entirely, but just slightly radially outside the point where surface 32 and surface 34 meet. This configuration provides a narrow angle spray pattern. An alternative configuration is shown in FIG. 6 for providing a wider angle spray pattern by disposing the passages 20 slightly toward the longitudinal axis of the nozzle 10, but not so far toward the longitudinal axis of the nozzle 10 that the exit of the passages 20 at the surface 32 is entirely on the axial side of the surface 34 at the exit of the passages 18. In other words, the opening of the fluid passages 20 at the frusto-conical surface 32 is partially disposed axially the surface 34. This configuration also provides more atomization, producing smaller droplets of the feed material. In other words, disposing the fluid passages 20 slightly toward the longitudinal axis results in the energy of the atomizing fluid being used more for atomization and less for deflecting the feed material. Conversely, disposing the fluid passages 20 slightly away from the longitudinal axis results in less atomization, but a narrower angle spray pattern.

The operation of the prilling nozzle 10 is simple. The feed material is conducted through bore 12 from feed conduit 16 and forced through the exit passages 18. Simultaneously, an atomizing fluid is forced through the passages 20 to impinge on the feed material exiting the passages 18, atomizing the feed material. Since there is normally no fouling of the passages 20, feed material hardened in the apparatus while it is not in use can be easily made molten and flowable by passing heated atomizing fluid through the conduit 22 and the passages 20. The operation and utility of the nozzle is more fully illustrated by way of the following examples.

EXAMPLES

The nozzle illustrated in FIGS. 1–4 was machined with 20 of the exit passages 18 each having an inside diameter of 1.59 mm and making an angle of 110° with the longitudinal axis of the nozzle 10. Projecting portion 30 had an outside diameter of 24.1 mm and surface 34 extended 5.4 mm from the surface 32. There were 20 of the atomizing fluid passages 20 corresponding with the passages 18 and having the same diameter. The passages 20 were machined at an angle of 160° with respect to the longitudinal axis of the nozzle 10, and exited at the surface 32 approximately at the point at which surfaces 32 and 34 met.

The nozzle was connected to a double pipe as shown in FIGS. 1–4. Molten polyoxyethylene glycol was supplied to the bore 12 and nitrogen at about 80° C. was supplied through the annular portion of the double pipe to the passages 20. The operating conditions are summarized in Table I.

TABLE I

| Example | Polyoxyethylene Glycol Density (g/cm$^3$) | Viscosity (cm$^2$/sec) | Flow Rate (kg/hr) | Nitrogen Flow Rate (m$^3$/hr @ STP) | Pressure (KPa) |
|---|---|---|---|---|---|
| 1 | 1.015 | 8.0[1] | 91 | 71.4 | 446 |
| 2 | 1.015 | 8.0[1] | 182 | 71.4 | 446 |
| 3 | 1.015 | 8.0[1] | 273 | 71.4 | 446 |
| 4 | 1.015 | 8.0[1] | 363 | 71.4 | 446 |
| 5 | 1.015 | 8.0[1] | 454 | 71.4 | 446 |
| 6 | 1.020 | 0.9[2] | 386 | 49.3 | 253 |
| 7 | 1.020 | 0.9[2] | 386 | 73.1 | 418 |

[1]Feed material prilled and viscosity determined at 100° C.
[2]Feed material prilled and viscosity determined at 80° C.

The prilled product was then screened to determine size distribution. The rsults are presented in Table II.

TABLE II

| Sieve Mesh[1] | Weight Percent Ex. 1 | Ex. 2 | Ex. 3 | Ex. 4 | Ex. 5 | Ex. 6 | Ex. 7 |
|---|---|---|---|---|---|---|---|
| +24 | 1.1 | 4.0 | 13.9 | 26.3 | 26.7 | 22.6 | 1.2 |
| −24/+32 | 4.2 | 11.3 | 22.1 | 32.0 | 37.6 | 26.7 | 16.4 |
| −32/+48 | 32.2 | 48.0 | 47.2 | 33.7 | 30.2 | 39.3 | 66.6 |
| −48/+65 | 14.1 | 9.9 | 6.5 | 3.9 | 2.4 | 7.7 | 10.8 |
| −65 | 48.4 | 26.8 | 10.3 | 4.1 | 3.1 | 3.7 | 5.0 |

[1]Tyler sieve series; "+" indicates "retained on", "−" indicates "passed through".

In Table I, it is noted that the same nozzle is adapted to obtain the desired particle size distributions seen in Table II merely by adjusting the nitrogen pressure and flow rate relative to the feed material flow rate.

While the invention is described as having utility in prilling a hardenable feed material, it is contemplated that the apparatus is also useful in atomizing liquids which do not produce prilled particles.

The foregoing disclosure and description of the invention are illustrative and explanatory thereof and various changes in the size, shape and materials as well as in the details of the preferred embodiment may be made without departing from the spirit of the invention.

I claim:

1. A prilling apparatus, comprising:
a nozzle body having a convex frusto-conical surface and a portion projecting from said surface, said surface and said portion having a common longitudinal axis, said frusto-conical surface being at an angle with respect to said longitudinal axis of from about 90° to about 130°;
a central bore formed in said nozzle body, said bore adapted to conduct molten, hardenable feed material therethrough;
a plurality of exit passages formed in said projecting portion and in fluid communication between said bore and exterior of said nozzle body, said exit passages opening entirely from said projecting portion adjacent said frusto-conical surface, said passages extending essentially radially from said longitudinal axis at an angle of from about 90° to about 130° with respect to said axis which is substantially equivalent to said angle of said frusto-conical surface; and a plurality of fluid passages formed in said body and adapted to conduct atomizing fluid therethrough said fluid passages opening at said frusto-conical surface adjacent said projecting portion, said fluid passages being disposed circumferentially about said longitudinal axis, each of said exit passages corresponding with a said fluid passage, said fluid passages being positioned at an angle of from about 140° to about parallel with respect to said longitudinal axis, said fluid passages being adapted to impinge an atomizing fluid upon feed material essentially exteriorly said nozzle body at an angle of from about 120° to about 160° when the atomizing fluid and the feed material are expelled under pressure from said fluid passages and said exit passages, respectively, thereby atomizing said feed material.

2. The apparatus of claim 1, wherein said angle of said exit passages is about 105°-115° with respect to said longitudinal axis.

3. The apparatus of claim 1, wherein said angle of said fluid passages is about 155°-165° with respect to said longitudinal axis.

4. The apparatus of claim 1, wherein said impingement angle is about 135°-145°.

5. The apparatus of claim 1, wherein said fluid passages open partially from said frusto-conical surface and partially into said exit passages.

6. The apparatus of claim 1, wherein said fluid passages open entirely from said frusto-conical surface immediately adjacent said opening of said exit passages from said projecting portion.

7. The apparatus of claim 1, wherein said fluid passages open entirely from said frusto-conical surface at a point slightly radially disposed from said opening of said exit passages from said projecting portion.

8. The apparatus of claim 1, wherein said projecting portion has a frusto-conical surface from which said exit passages open which is at an angle with respect to said longitudinal axis which is substantially equivalent to said angle of said fluid passages.

9. A method of prilling molten, hardenable feed material, comprising the steps of:

conducting a molten, hardenable feed material through a central bore formed in a nozzle body, said nozzle body having a convex frusto-conical surface and a portion projecting from said surface, said surface and said portion having a common longitudinal axis, said frusto-conical surface being at an angle with respect to said longitudinal axis of from about 90° to about 130°;

expelling said feed material under pressure from a plurality of exit passages formed in said projecting portion and in fluid communication between said bore and exterior of said nozzle body, said exit passages opening entirely from said projecting portion adjacent said frusto-conical surface, said passages extending essentially radially from said longitudinal axis at an angle which is substantially equivalent to said angle of said frusto-conical surface;

expelling an atomizing fluid under pressure from a plurality of fluid passages formed in said body, said fluid passages opening at said frusto-conical surface adjacent said projecting portion, said fluid passages being disposed circumferentially about said longitudinal axis, each of said exit passages corresponding with a said fluid passage, said fluid passages being positioned at an angle of from about 140° to about parallel with respect to said longitudinal axis; and impinging said expelled atomizing fluid upon said expelled feed material essentially exteriorly said nozzle body at an angle of from about 120° to about 160°, thereby atomizing said feed material.

10. The method of claim 9, wherein said angle of said exit passages is about 105°-115° with respect to said longitudinal axis.

11. The method of claim 9, wherein said angle of said fluid passages is about 155°-165° with respect to said longitudinal axis.

12. The method of claim 9, wherein said angle of said impingement is about 135°-145°.

13. The method of claim 9, wherein said feed material is polyoxyethylene glycol and said atomizing fluid is nitrogen.

* * * * *